US009016447B2

United States Patent
De Lillo et al.

(10) Patent No.: US 9,016,447 B2
(45) Date of Patent: Apr. 28, 2015

(54) PISTON FOR A DAMPING-ADJUSTABLE SHOCK-ABSORBER, PARTICULARLY FOR A VEHICLE SUSPENSION, PROVIDED WITH FOUR PASSIVE FLOW-CONTROL VALVES AND WITH A FLOW-DIVIDING SOLENOID VALVE

(75) Inventors: Gianfranco De Lillo, Asti (IT); Massimo Trinchera, Turin (IT); Walter Bruno, Asti (IT)

(73) Assignee: Sistemi Sospensioni S.p.A., Corbetta (Milano) (IT)

( * ) Notice: Subject to any disclaimer, the term of this patent is extended or adjusted under 35 U.S.C. 154(b) by 0 days.

(21) Appl. No.: 13/811,971

(22) PCT Filed: Aug. 4, 2011

(86) PCT No.: PCT/EP2011/063479
§ 371 (c)(1),
(2), (4) Date: Jan. 24, 2013

(87) PCT Pub. No.: WO2013/017050
PCT Pub. Date: Feb. 9, 2012

(65) Prior Publication Data
US 2013/0126282 A1 May 23, 2013

(30) Foreign Application Priority Data
Aug. 4, 2010 (IT) .............................. TO2010A0675

(51) Int. Cl.
*F16F 9/44* (2006.01)
*F16F 9/34* (2006.01)
*B60G 13/06* (2006.01)
*F16F 9/348* (2006.01)
(Continued)

(52) U.S. Cl.
CPC . *F16F 9/34* (2013.01); *B60G 13/06* (2013.01); *F16F 9/348* (2013.01); *F16F 9/466* (2013.01); *F16F 9/5126* (2013.01); *F16F 9/516* (2013.01); *F16F 9/18* (2013.01); *F16F 9/3214* (2013.01)

(58) Field of Classification Search
CPC ............. F16F 9/46; F16F 9/461; F16F 9/462; F16F 9/463; F16F 9/464; F16F 9/465; F16F 9/469
USPC .......... 188/266.2, 266.3, 266.4, 266.5, 266.6, 188/281, 282.2, 282.4, 313, 316, 317, 188/322.15, 322.22, 299.1, 319.1, 282.1
See application file for complete search history.

(56) References Cited

U.S. PATENT DOCUMENTS 4,352,417 A * 10/1982 Stinson ....................... 188/282.5
4,615,420 A * 10/1986 Mourray .................. 188/322.15
(Continued)

FOREIGN PATENT DOCUMENTS

| DE | 19808698 A1 | 9/1999 |
|---|---|---|
| EP | 1983212 A2 | 10/2008 |
| WO | 2011/027314 A1 | 3/2011 |

OTHER PUBLICATIONS

Aug. 25, 2011 Italian Search Report and Written Opinion (PCT/EP2011/063479).

*Primary Examiner* — Nicholas J Lane
(74) *Attorney, Agent, or Firm* — Howard & Howard Attorneys PLLC (57) ABSTRACT

A piston (10) comprises a first pair of passive flow-control valves (18, 20) [namely, a first compensation valve (18) and a first rebound valve (20)], a second pair of passive flow-control valves (22, 24) [namely, a second compensation valve (22) and a second rebound valve (24)], and a flow-dividing solenoid valve (14) shiftable between a first operating position [in which it allows flow of a damping fluid between an upper chamber and a lower chamber of a shock absorber through the first pair of passive flow-control valves (18, 20) and second pair of passive flow-control valves (22, 24)] and a second operating position [in which it allows the flow of the damping fluid between the upper chamber and lower chamber through only the second pair of passive flow-control valves (22, 24)]. The solenoid valve (14) is normally open (i.e., it is normally kept in the first operating position).

8 Claims, 4 Drawing Sheets

(51) Int. Cl.
*F16F 9/46* (2006.01)
*F16F 9/512* (2006.01)
*F16F 9/18* (2006.01)
*F16F 9/32* (2006.01)
*F16F 9/516* (2006.01)

(56) References Cited

U.S. PATENT DOCUMENTS

| | | | | |
|---|---|---|---|---|
| 4,723,640 A | * | 2/1988 | Beck | 188/282.3 |
| 4,997,068 A | * | 3/1991 | Ashiba | 188/282.5 |
| 5,035,306 A | * | 7/1991 | Ashiba | 188/282.3 |
| 5,205,385 A | * | 4/1993 | Ashiba | 188/266.5 |
| 5,207,300 A | * | 5/1993 | Engel et al. | 188/266.2 |
| 5,219,414 A | * | 6/1993 | Yamaoka | 188/284 |
| 5,368,142 A | * | 11/1994 | Ashiba et al. | 188/282.1 |
| 5,392,883 A | * | 2/1995 | Huang et al. | 188/282.3 |
| 6,085,877 A | * | 7/2000 | Robinson et al. | 188/322.15 |
| 6,776,269 B1 | | 8/2004 | Schel | |
| 2012/0181126 A1 | * | 7/2012 | de Kock | 188/282.8 |

* cited by examiner

PISTON FOR A DAMPING-ADJUSTABLE SHOCK-ABSORBER, PARTICULARLY FOR A VEHICLE SUSPENSION, PROVIDED WITH FOUR PASSIVE FLOW-CONTROL VALVES AND WITH A FLOW-DIVIDING SOLENOID VALVE

CROSS-REFERENCE TO RELATED APPLICATIONS

This application is a "national phase" application based upon International Patent Application PCT/EP2011/063479 filed on Aug. 4, 2011 and entitled "Piston for a Damping-Adjustable Shock-Absorber, Particularly for a Vehicle Suspension, Provided with Four Passive Flow-Control Valves and with a Flow-Dividing Solenoid Valve," which, in turn, is based upon and claims priority to Italian Patent Application TO2010A000675 filed on Aug. 4, 2010.

BACKGROUND OF INVENTION

The invention-relates to, generally, a piston for a damping-adjustable shock absorber intended, to be used in a vehicle suspension. More specifically, the invention relates to such a piston arranged to be slidably mounted inside a cylinder of the shock absorber to split the shock absorber into a lower chamber and an upper chamber.

SUMMARY OF INVENTION

The invention overcomes the disadvantages in the related art in a piston for a damping-adjustable shock absorber and arranged to be slidably mounted inside a cylinder of the shock absorber to split the shock absorber into a lower chamber and an upper chamber. The piston comprises a first pair of passive flow-control valves for controlling the flow of a damping fluid between the lower chamber and the upper chamber via a first flow path. The first pair of passive flow-control valves include a compensation valve and a rebound valve that are made as check valves arranged to control the flow of the damping fluid from the lower chamber to the upper chamber ("compression" phase) and from the upper chamber to the lower chamber ("rebound" phase), respectively.

A second pair of passive flow-control valves control the flow of the damping fluid between the lower chamber and the upper chamber via a second flow path separate from the first one. The second pair of passive flow-control valves include a compensation valve and a rebound valve that axe made as check valves arranged to control the flow of the damping fluid from the lower chamber to the upper chamber ("compression" phase) and from, the upper chamber to the lower chamber ("rebound" phase), respectively.

A flow-dividing solenoid valve is shiftable between a first operating position, in which it allows the flow of the damping fluid between the upper chamber and the lower chamber both, via the first pair of flow-control valves and via the second pair of flow-control valves (i.e., both via the first flow path and via the second one), and a second operating position, in which it allows the flow of the damping fluid between the upper chamber and the lower chamber only via the second pair of flow-control valves (i.e., only via the second flow path).

Each of the passive flow-control valves is made as a passive valve including at least one resilient element adapted to keep the valve normally closed. The resilient element associated to the compensation and rebound valves forming the first pair of flow-control valves has a stiffness lower than that of the resilient element associated to the compensation and rebound valves, respectively, forming the second pair of passive flow-control valves, in such a manner that, when the flow-dividing solenoid valve is in the first operating position, the damping fluid can flow between the upper chamber and the lower chamber via the first pair of passive flow-control valves to which the less stiff resilient element is associated (hereinafter referred to as "minimum-curve passive flow-control valves"). Therefore, the shock absorber generates a lower damping force. Whereas, when the flow-dividing solenoid valve is in the second operating position, the damping fluid can flow between the upper chamber and the lower chamber via the second pair of passive flow-control valves to which the stiffer resilient element is associated (hereinafter referred to as "maximum-curve passive flow-control valves"). Therefore, the shock absorber generates a higher damping force.

It is an object of the invention to provide a piston for a damping-adjustable shock absorber of the above-specified type, which allows to reduce the energy consumption to the minimum.

A further object of the invention is to provide a piston for a damping-adjustable shock absorber of the above-specified type, which allows to adjust independently of each other the operating characteristics of the shock absorber (compression with open solenoid valve, rebound with open solenoid valve, compression with closed solenoid valve, and rebound with closed solenoid valve) and obtain pressure-flow rate operating characteristics (or, equivalently, force-speed operating characteristics) of so-called "degressive" type [i.e., including, immediately after a first ascending section (low flow rate or low speed), a second constant or at least not-ascending section (high flow rate or high speed)].

A still further object of the invention is to provide a piston for a damping-adjustable shock absorber of the above-specified type, which has a simple structure and a reliable operation.

In short, the invention is based on the idea of providing a piston for a damping-adjustable shock absorber of the above-specified type, in which the flow-dividing solenoid valve is made as a normally-open solenoid valve. In the "non-energized" condition of the solenoid, the damping fluid can flow between the upper chamber and the lower chamber of the shock absorber via the pair of minimum-curve passive flow-control valves, and hence, the shock absorber generates a lower damping force. Therefore, in normal driving conditions, in which a soft response of the suspensions is required to ensure driving comfort, the solenoids of the now-dividing solenoid valves of the damping-adjustable shock absorbers can be kept in the "non-energized" condition and, therefore, do not contribute to increase the energy consumption of the vehicle.

The passive flow-control valves are advantageously made as valves of the same type as that forming the subject matter of Italian Patent Application TO2009A000681 (or of the corresponding International Patent Application WO2011/1327314) in the applicant's name. In an embodiment, at least the two maximum-curve passive flow-control valves (compensation valve and rebound valve) and the minimum-curve rebound valve are made as valves of the above-mentioned type. Such a construction of the passive flow-control valves allows to obtain pressure-flow rate (or force-speed) operating characteristics of the shock absorber of "degressive" type. The pressure-Bow rate (or force-speed) operating characteristics of the shock absorber can also be adjusted independently of each other by acting both on the resilient elements and on the number and geometry of the adjustment discs of the passive flow-control valves.

Other objects, features, and advantages of the invention are readily appreciated as the invention becomes better understood while a subsequent detailed description of embodiments of the invention is read taken in conjunction with the accompanying drawing thereof.

BRIEF DESCRIPTION OF EACH FIGURE OF DRAWING OF INVENTION

DETAILS DESCRIPTION OF EMBODIMENTS OF INVENTION

In the following description and claims, terms such as "upper" and "lower" are to be intended as referring to the "normal mounting" condition of the shock absorber on the vehicle, in which the valve assembly (passive flow-control valves) of the piston is located in the bottom end portion of the piston.

Figure 1:
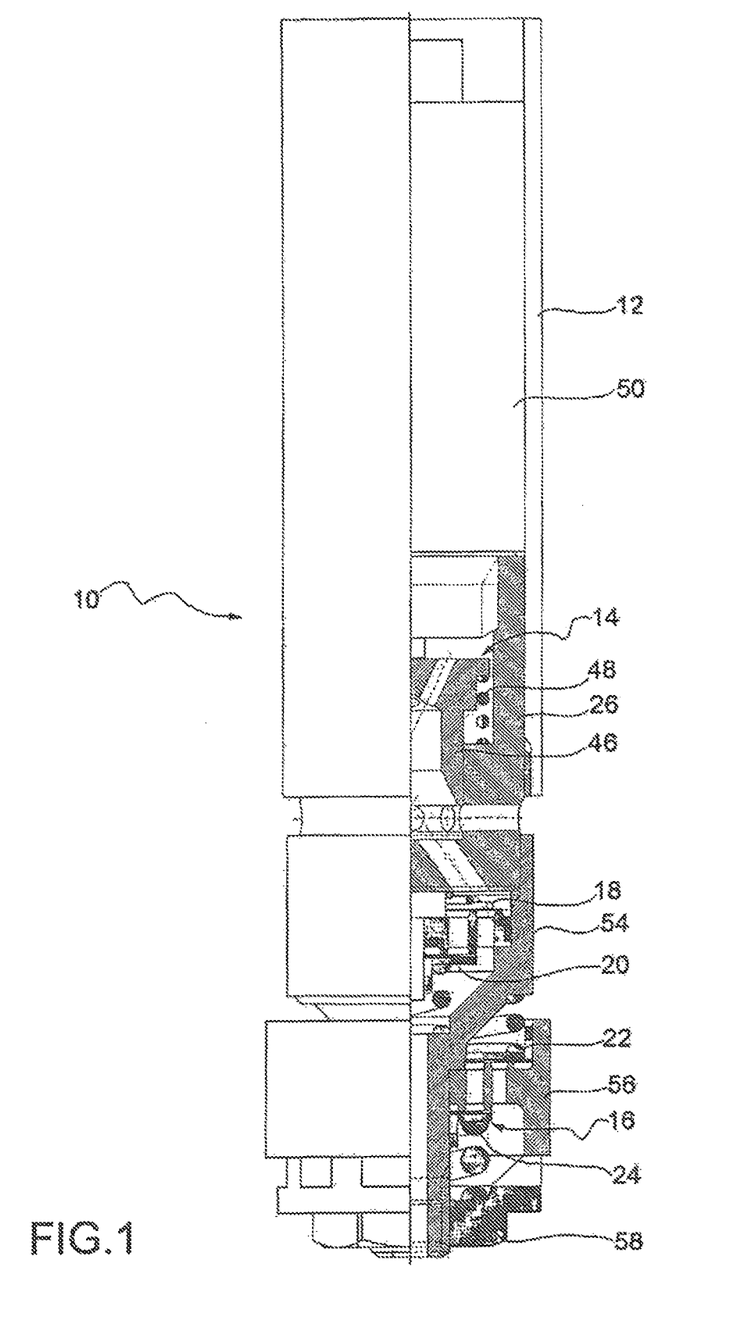
FIG. 1 is an axial sectional view of a piston for a damping-adjustable shock absorber according to an embodiment of the invention.

With reference first to FIG. 1, a piston for a damping-adjustable shock absorber, particularly for use in a vehicle suspension, is generally indicated 10. The piston 10 basically comprises a rod 12 inside of which a flow-dividing solenoid valve 14 (hereinafter simply referred to as "solenoid valve") is mounted, a valve assembly 16 that is mounted at the bottom end of the piston and includes a pair of minimum-curve passive flow-control valves IS. 20 (namely, a minimum-curve compensation valve 18 and a minimum-curve rebound valve 20) and a pair of maximum-curve passive flow-control valves 22, 24 (namely, a maximum-curve compensation valve 22 and a maximum-curve rebound valve 24), and a coupling body 26 axially interposed, between the rod 12 and the valve assembly 16. The expression "minimum curve" associated to the compensation valve 18 and to the rebound valve 20 means that these valves determine the minimum pressure-flow rate (or force-speed) characteristic curve of the shock absorber [i.e., the one in which the minimum value of the pressure (or of the force) (and, hence, the minimum, value of the braking force generated by the shock absorber) is associated to the same value of the flow rate (or of the speed)]. On the other hand, the expression "maximum curve" associated to the compensation valve 22 and to the rebound valve 24 means that these valves determine the maximum pressure-flow rate (or force-speed) characteristic curve of the shock absorber [i.e., the one in which the maximum, value of the pressure (or of the force) (and, hence, the maximum value of the braking force generated by the shock absorber) is associated to the same value of the flow rate (or of the speed)].

Figure 3:
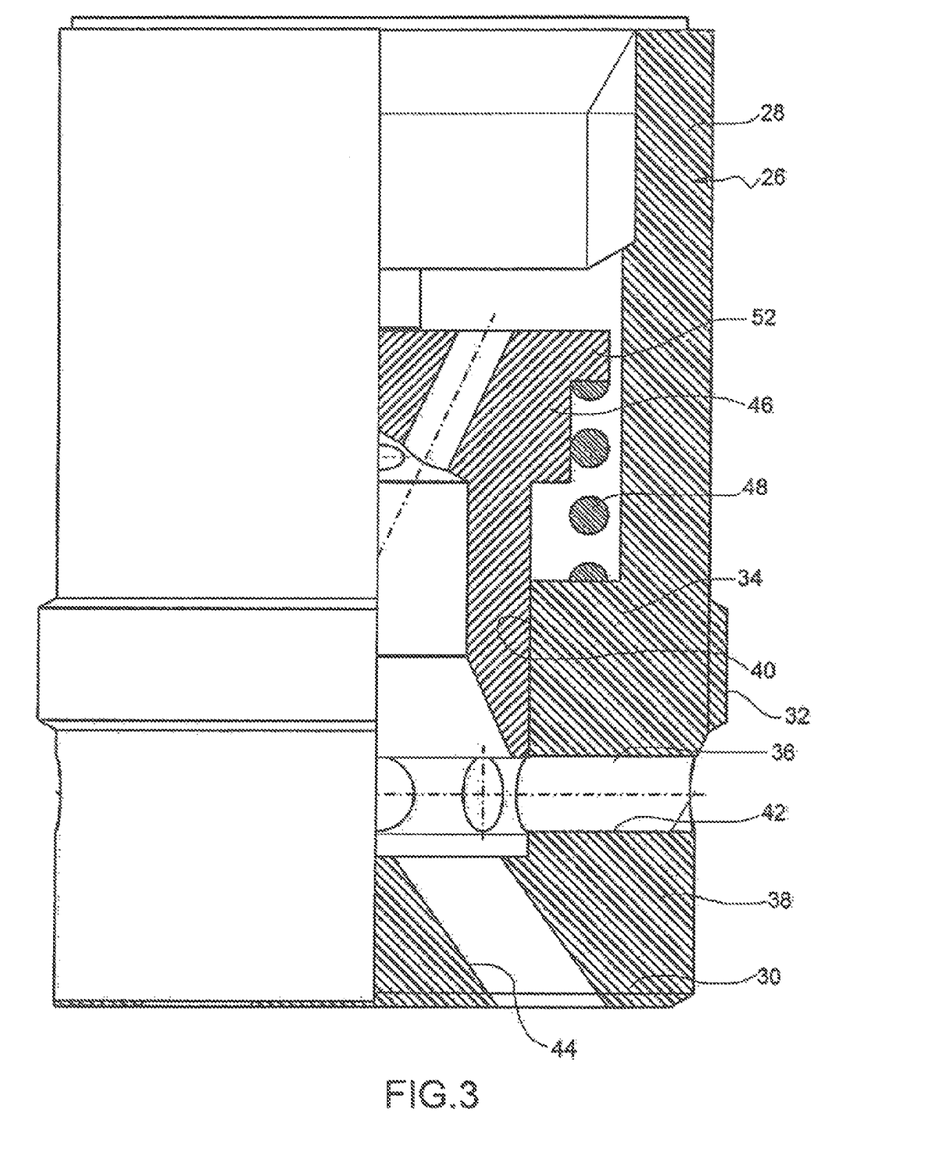
FIG. 3 is an axial sectional view showing, on an enlarged scale, the flow-dividing solenoid valve of the piston of FIG. 1.

With reference also to FIG. 3, the coupling body 26 integrally forms an upper cylindrical portion 28 and a lower cylindrical portion 30 and is fixed to the rod 12, for instance, by a threaded connection. The upper cylindrical portion 28 extends inside the rod 12 coaxially thereto. The lower cylindrical portion 30 integrally forms, in turn, an upper plate 34, an intermediate portion 36, and a lower plate 38. The upper plate 34 extends inside the rod 12 and has on its outer cylindrical surface an external threading 32 cooperating with a corresponding internal threading of the rod 12 to provide the aforesaid threaded connection whereas the intermediate portion 36 and the lower plate 38 project downward from the rod 12. A central axial bore 40 passes both through the upper plate 34 and through the intermediate portion 36. The intermediate portion 36 also has a plurality of radial bores 42 that put the central axial bore 40 in fluid communication with the outside of the piston. The lower plate 38 also has a plurality of oblique bores 44 that extend downward and outward and put the central axial bore 40 in fluid communication with the valve assembly 16.

The solenoid valve 14 basically includes a poppet 46, a spring 48, and a solenoid 50. The poppet 46 is mounted to be axially slidable in the central axial bore 40 of the coupling body 26 between an upper end-of-travel position or open position (shown in FIGS. 1 and 3), in which it leaves the radial bores 42 open, and a lower end-of-travel position or closed position (not shown in the drawing), in which it closes the radial bores 42. The spring 48 applies on the poppet 46 a resilient force tending to keep it in the open position. In the illustrated embodiment, the spring 48 is made as a cylindrical helical spring axially interposed between the upper plate 34 of the coupling body 26 and a flange 52 of the poppet 46, but it might also be a spring of different type. The solenoid 50 is received inside the rod 12 and is operable by an electronic control unit (not shown) to apply on the poppet 46 an electromagnetic repulsion force lending to move the poppet 46 into the closed position by overcoming the biasing resilient force applied by the spring 48. The solenoid valve 14 is, therefore, of the normally-open type [i.e., in the condition in which the solenoid 50 is not energised, the poppet 46 is in the open position, in which it allows the damping fluid to flow between the lower chamber and the upper chamber of the shock absorber via the mini mum-curve flow-control valves (compensation valve 18 and rebound valve 20)].

In normal driving conditions, in which a soft response of the shock absorber is generally required, the solenoid 50 of the solenoid valve 14 is, thus, kept in the "non-energized" state, and the energy consumption of the vehicle is, thus, not increased. The solenoid 50 is energized only in case of need, when an increase in the braking force generated by the shock absorber is required. The solenoid valve 14 may have a discrete way of operation (i.e., may be moved only into the two open and closed positions) or may have a continuous way of operation (i.e., may be moved continuously between the two open and closed positions). In the first case, the shock absorber has only the following four operating characteristics: rebound with open solenoid valve (minimum curve), rebound with closed solenoid valve (maximum curve), compression with open solenoid valve (minimum curve), and compression with closed solenoid valve (maximum curve). An example of operating characteristics that can be obtained with a shock absorber provided with a piston according to the invention is shown in the pressure-flow-rate diagram of FIG. 4. In the second case, the operating characteristic: curve of the shock absorber can be adjusted each lime continuously, both in the "rebound" phase and in the "compression" phase, between a minimum curve (open solenoid valve) and a maximum curve (closed solenoid valve).

Figure 2:
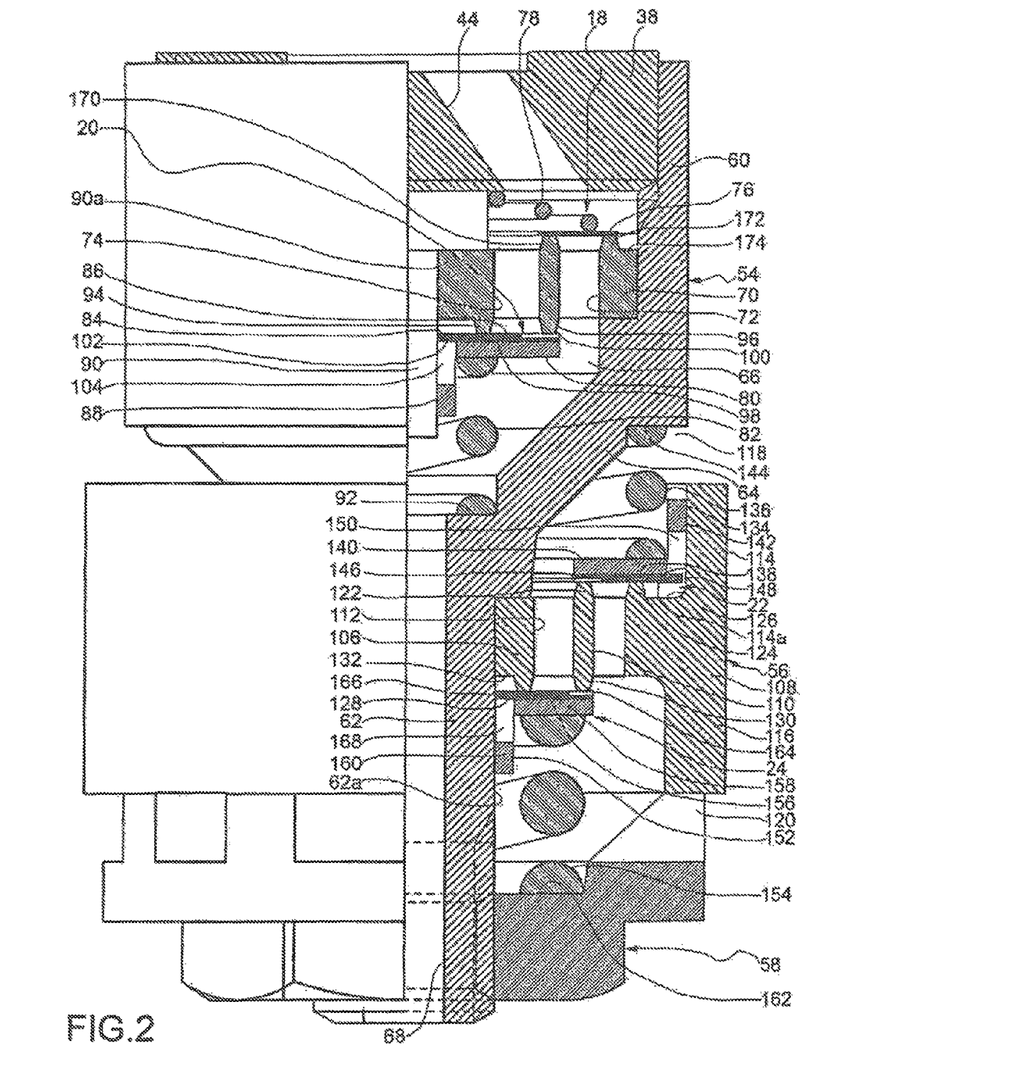
FIG. 2 is an axial sectional view showing, on an enlarged scale, the bottom end portion of the piston of FIG. 1 with the two pairs of passive flow-control valves (that is to say, the pair of minimum-curve passive flow-control valves and the pair of maximum-curve passive flow-control valves, respectively)

With reference now in particular to FIG. 2, the valve assembly 16 includes, in addition to the above-mentioned valves IS, 20, 22, 24, an inner body 54, an outer body 56, and a cover 58.

The inner body 54 integrally forms a hollow cylindrical upper portion 60, a hollow cylindrical lower portion 62, and a hollow frusto-conical intermediate portion 64 connecting the upper portion 60 and the lower portion 62. The upper portion 60 is fixed to the coupling body 26 and encloses a chamber 66 in which the minimum-curve compensation valve 18 and the minimum-curve rebound valve 20 are received and into which the oblique bores 44 of the coupling body 26 debouch. The lower portion 62 has a central axial bore 68 debouching at its bottom into the lower chamber of the shock absorber. Therefore, with the solenoid valve 14 in the open position, the damping fluid can flow from the lower chamber to the upper chamber of the shock absorber in order through the central axial bore 68 of the lower portion 62 of the inner body 54 of the valve assembly 16, through the minimum-curve compensation valve 18 in the chamber 66 of the inner body 54 of the valve assembly 16, and through the oblique bores 44, the central axial bore 40, and the radial bores 42 of the coupling body 26 and, in the opposite direction (that is to say, from the upper chamber to the lower chamber of the shock absorber), in order through, the radial, bores 44, the central axial bore 40, and the oblique bores 44 of the coupling body 26, through the minimum-curve rebound valve 20 in the chamber 66 of the inner body 54 of the valve assembly 16, and through the central axial bore 68 of the lower portion 62 of the inner body 54 of the valve assembly 16.

A partition plate 70 is received in the chamber 66 of the inner body 54 and has a series of first axial through-bores 72 (only one of which can be seen in the sectional view of FIG. 2) located along a first circumference of larger diameter and a series of second axial through-bores 74 (only one of which can be seen in the sectional view of FIG. 2) located along a second circumference of smaller, diameter. The first and second axial through-bores 72, 74 put the upper portion of the chamber 66, which is at the same pressure as that of the upper chamber of the shock absorber, in fluid communication with the lower portion of the chamber 66, which is at the same pressure as that of the lower chamber of the shock absorber. The minimum-curve compensation valve 18 is associated to the first axial through-bores 72 whereas the minimum-curve rebound valve 20 is associated to the second axial through-bores 74.

The minimum-curve compensation valve 18 is a unidirectional valve including a closing element 76 and a spring 78. The closing element 76 is a thin disc of annular shape mounted to be axially movable between a closed position (shown in FIG. 2), in which it is in contact with the top face of the partition plate 70 and closes the axial through-bores 72 (thereby, preventing the damping fluid, from flowing from the upper chamber to the lower chamber of the shock absorber), and an open position (not shown in the drawing), in which it is raised with respect to the top face of the partition plate 76 and opens the axial through-bores 72 [thereby, allowing the damping fluid to flow from the lower chamber to the upper chamber of the shock absorber ("compression" phase)]. The spring 78 acts on the closing element 76 to apply on this latter a resilient force tending to keep it in the closed position, in the illustrated example, the spring 78 is a conical helical spring that abuts as its top against the lower plate 38 of the lower cylindrical portion 30 of the coupling body 2b and at its bottom against the closing element 76.

The mini mum-curve rebound valve 20 is a unidirectional valve of the same type as the one forming the subject matter of the above-mentioned Italian Patent Application TO2009A000681 and basically includes a movable element 80, a spring 82, and a plurality of adjustment discs 84. The movable element 80 is received in the chamber 66 of the inner body 54 to slide in the axial direction of the piston and is made as a cup-shaped element integrally forming a bottom wall 8b facing toward the partition plate 70 and a cylindrical lateral wall 88 graded along the cylindrical lateral surface of a guide element 90 that is received in the chamber 66 and extends in the axial direction of the piston. The spring 82, which, in the illustrated example, is a cylindrical helical spring [but which might also be a spring (or a plurality of springs) of different type], is axially interposed between an abutment surface 92 formed by the inner body 54 and the movable element 80 to apply on this latter a resilient force that is directed upward and tends to urge it toward the partition plate 70. The partition plate 70 forms, on its bottom face, a radially inner annular projection 94 and a radially outer annular projection 96 that radially delimit the second axial through-bores 74. The partition plate 70 also has, on its bottom lace, an annular cavity 98 that is open downward and is radially delimited between the cylindrical lateral surface of the guide element 90 and the radially inner annular projection 94. The assembly formed by the adjustment discs 84 stacked on one another is axially interposed between the partition plate 70 and the movable element 80 and is capable of sliding axially along the cylindrical lateral surface of the guide element 90.

In the "closed" condition, of the valve 20 (condition illustrated in FIG. 2), the assembly formed by the adjustment discs 84 rests on the annular projections 94, 96 of the bottom lace of the partition plate 70. The spring 82, acting on the adjustment discs 84 via the movable element 80, tends to keep the valve 20 in this condition. At least one radial opening 100 is provided in the adjustment discs 84 [or, in an embodiment, at least in the top adjustment disc (i.e. in the adjustment disc that is directly in contact, in the "closed" condition of the valve 20, with the annular projections 94, 96)] and extends astride the radially outer annular projection 96 to allow, even in the "closed" condition of the valve 20, the damping fluid coming from the upper chamber of the shock absorber through the second axial through-bores 74 to flow toward the lower chamber of the shock absorber passing over the radially outer annular projection 96. Moreover, the adjustment discs 84 advantageously have an internal diameter slightly larger than that of the cylindrical lateral surface of the guide element 90 to define with this latter a restrictor 102 (that is to say, a passage having a reduced cross-section) for the damping fluid flowing from the annular cavity 98 to the lower chamber of the shock absorber. Moreover, in the area of connection between the bottom wall 86 and the cylindrical lateral wall 88 of the movable element 80, at least one opening 104 is provided, which is made in such a manner as to put the annular cavity 98 in fluid communication with the lower chamber of the shock absorber through the restrictor 102. The opening 104 has, therefore, the function of allowing the damping fluid collected in the annular cavity 98 (as a result of the movable element 80 moving away from the partition plate 70) to flow toward the lower chamber of the shock absorber.

In general terms, the minimum-curve rebound valve 20 has:

a first variable restrictor (formed in the present case by the passage between the radially outer annular projection 96 and the set of adjustment discs 84), the restriction amount of which depends on the position of the movable element 80 and through which the upper chamber of the shock absorber is in fluid communication with the lower chamber of the shock absorber;

a second variable restrictor (formed in the present case by the passage between, the radially inner annular projection 94 and the set of adjustment discs 84), the restriction amount of which depends on the position of the movable element 80 and through which the upper chamber of the shock absorber is in fluid communication with an auxiliary chamber of the waive (formed in the present case by the annular cavity 98);

a first fixed restrictor (formed in the present case by the passage 102 between the adjustment discs 84 and the cylindrical lateral surface of the guide element 90) through which the auxiliary chamber of the valve is in fluid communication with the lower chamber of the shock absorber in such a manner that the value of the pressure in the auxiliary chamber 98 of the valve, along with the opening force of the valve that opposes the resilient force produced by the spring 82, increases as a result of an increase in the opening amount of the valve; and a second fixed restrictor (formed in the present case by the radial opening 100 provided at least in the top adjustment disc 84) through which the upper chamber of the shock absorber is in fluid communication with the lower chamber of the shock absorber parallel with the first variable restrictor.

The aforesaid second fixed, restrictor might also be omitted.

The outer body 56 of the valve assembly 16 includes a partition plate 10b and a cylindrical sleeve 108 that, in an embodiment, is made as a single piece. The partition plate 10b is fixed to the inner body 54 (namely, to the hollow cylindrical lower portion 62 of the inner body 54) and has a series of first axial through-bores 110 (only one of which can be seen in the sectional view of FIG. 2) located along a first circumference of larger diameter and a series of second axial through-bores 112 (only one of which, can be seen in the sectional view of FIG. 2) located along a second circumference of smaller diameter. The first and second axial through-bores 110, 112 put the upper chamber in fluid communication with the lower chamber of the shock absorber. The maximum-curve compensation valve 22 is associated to the first axial through-bores 110 whereas the maximum-curve rebound valve 24 is associated to the second axial through-bores 112. The cylindrical sleeve 108 is arranged with its outer lateral surface tightly slidable along the inner cylindrical surface of the shock absorber and includes an upper sleeve portion 114 extending upward from the partition plate 106 and a lower sleeve portion 116 extending downward from the partition plate 106.

Between the upper sleeve portion 114 of the outer body 56 and the hollow cylindrical upper portion 60 of the inner body 54, a passage 118 is defined through which the damping fluid flowing from the lower chamber of the shock-absorber through the maximum-curve compensation valve 22 can reach, the upper chamber of the shock absorber and vice versa (the damping fluid flowing from the upper chamber of the shock absorber can reach the second axial through-bores 112 and, from here, enter the lower chamber of the shock absorber under control of the maximum-curve rebound valve 24). Likewise, between the lower sleeve portion 116 of the outer body 56 and the cover 58, a passage 120 is defined through which the damping fluid flowing from the lower chamber of the shock absorber can reach the first axial through-bores 110 and, horn here, enter the upper chamber of the shock absorber under control of the maximum-curve compensation valve 22 and vice versa (the damping fluid flowing from the upper chamber of the shock absorber through the maximum-curve rebound valve 24 can enter the lower chamber of the shock absorber).

The partition plate 106 forms, on its top (ace, a radially inner annular projection 122 and a radially outer annular projection 124 that radially delimit the first axial through-bores 110. The partition plate 106 also has, on its top face, an annular cavity 126 that is open upward and is radially delimited between the radially outer annular projection 124 and the inner cylindrical lateral surface of the upper sleeve portion 114. The partition plate 106 forms, on its bottom fees, a radially inner annular projection 128 and a radially outer annular projection 130 that delimit radially the second axial through-bores 112. The partition plate 106 also has, on its bottom lace, an annular cavity 132 that is open downward and is radially delimited between the radially inner annular projection 128 and the outer cylindrical lateral surface of the hollow cylindrical lower portion 62 of the inner body 54.

The maximum-curve compensation valve 22 is also, like the minimum-curve rebound valve 20, a unidirectional valve of the same type as the one forming the subject matter of the above-mentioned Italian Patent Application TO2009A000681 and basically includes a movable element 134, a spring 136, and a plurality of adjustment discs 138. The movable element 134 is slidably mounted in the axial direction of the piston and is made as a cup-shaped element integrally forming a bottom wait 140 facing toward the partition plate 106 and a cylindrical lateral wall 142 guided along the inner cylindrical lateral surface of the upper sleeve portion 114. The spring 136, which, in the illustrated example, is a cylindrical helical spring [but might also be a spring (or a plurality of springs) of different type], is axially interposed between an abutment surface 144 formed by the inner body 54 and the movable element 134 to apply on this latter a resilient force that is directed downward and tends to urge if toward the partition plate 106. The assembly formed by the adjustment discs 138 stacked on one another is axially interposed between the partition plate 106 and the movable element 134 and is capable of sliding axially along the inner cylindrical lateral surface of the upper sleeve portion 114. In the "closed" condition of the valve 22 (condition illustrated in FIG. 2), the set of adjustment discs 138 rests on the annular projections 122, 124 on the top face of the partition plate 106. The spring 136, acting on the adjustment discs 138 through the movable element 134, tends to keep the valve 22 in this condition.

At least one radial opening 146 is provided in the adjustment discs 138 [or better, at least in the bottom, adjustment disc (i.e., in the adjustment disc directly in contact, in the "closed" condition of the valve 22, with the annular projections 122 and 124)] and extends astride the radially outer annular projection 124 to allow, even in the "closed" condition of the valve 22, the damping fluid coming from the lower chamber of the shock absorber via the first axial through-bores 110 to flow toward the upper chamber of the shock absorber passing over the radially outer annular projection 124. Moreover, the adjustment discs 138 advantageously have an external diameter slightly smaller than that of the inner cylindrical lateral surface of the upper sleeve portion 114 to define with this latter a restrictor 148 (that, is to say, a passage with reduced cross-section) for the damping fluid flowing from the annular cavity 126 to the upper chamber of the shook absorber. Moreover, in the area of connection between the bottom wall 140 and the cylindrical lateral wall 142 of the movable element 134, at least one opening 150 is provided, which is made in such a manner as to put the annular cavity 126 in fluid communication with the upper chamber of the shock absorber through the restrictor 148. The opening 150 has, therefore, the function of allowing the damping fluid collected in the annular cavity 126 (as a result of the movable element 134 moving away from the partition plate 106) to flow toward the upper chamber of the shock absorber.

In general terms, the maximum-curve compensation valve 22 has:

a first variable restrictor (formed in the present case by the passage between the radially inner annular projection 146 and the set of adjustment discs 138), the restriction amount of which depends on the position of the movable element 134 and through which the lower chamber of the shock, absorber is in fluid communication with the upper chamber of the shock absorber;

a second variable restrictor (formed in the present case by the passage between the radially outer, annular projection 124 and the set of adjustment discs 138), the restriction amount of which depends on the position of the movable element 134 and through which the lower chamber of the shock absorber is in fluid communication with an auxiliary chamber of the valve (formed in the present case by the annular cavity 126);

a first fixed restrictor (formed in the present case by the passage 148 between the adjustment discs 138 and the inner cylindrical lateral surface of the upper sleeve portion 114 of the outer body 56) through which the auxiliary chamber of the valve is in fluid communication with the upper chamber of the shock absorber in such a manner that the value of the pressure in the auxiliary chamber 126 of the valve, along with the opening force of the valve that opposes the resilient force produced by the spring 136, increases as a result of the increase in the opening amount of the valve; and a second fixed restrictor (formed in the present case by the radial opening 146 provided at least in the bottom adjustment disc 138) through which the lower chamber of the shock absorber is in fluid communication with the upper chamber of the shock absorber parallel with the first variable restrictor.

The aforesaid second fixed restrictor might also be omitted.

The maximum-curve rebound valve 24 is also, like the minimum-curve rebound valve 20 and the maximum-curve compensation valve 22, a unidirectional valve of the same type as the one forming the subject matter of the above-mentioned Italian Patent Application TO2009A800681 and basically includes a movable element 152, a spring 154, and a plurality of adjustment discs 156. The movable element 152 is slidably mounted in the axial direction of the piston and is made as a cup-shaped element integrally forming a bottom wall 158 facing toward the partition plate 106 and a cylindrical lateral, wall 160 guided along the outer cylindrical lateral surface of the hollow cylindrical lower portion 62 of the inner body 54. The spring 154, which, in the illustrated example, is a cylindrical helical spring [but might also be a spring (or a plurality of springs) of different type], is axially interposed between an abutment surface 162 formed by the cover 58 and the movable element 152 to apply on this latter a resilient force that is directed upward and tends to urge it toward the partition plate 106. The set of adjustment discs 156 stacked on one another is axially interposed between the partition plate 106 and the movable element 152 and is capable of sliding axially along the outer cylindrical lateral surface of the hollow cylindrical lower portion 62 of the inner body 54.

In the "closed" condition of the valve 24 (condition illustrated in FIG. 2), the set of adjustment discs 156 rests against the annular projections 128, 130 on the bottom face of the partition plate 106. The spring 154, acting on the adjustment discs 156 through the movable element 152, tends to keep the valve 24 in this condition. At least one radial opening 164 is provided in the adjustment discs 156 [or better, at least in the top adjustment disc (i.e., in the adjustment disc directly in contact, in the "closed" condition of the valve 24, with the annular projections 128, 130)] and extends astride the radially outer annular projection 130 to allow, even in the "closed" condition of the valve 24, the damping fluid coming from the upper chamber of the shock absorber via the second axial through-bores 112 to flow toward the lower chamber of the shock absorber passing over the radially outer annular projection 130. Moreover, the adjustment discs 156 advantageously have an internal diameter slightly larger than that of the outer cylindrical lateral surface of the hollow cylindrical lower portion 62 of the inner body 54 to define with this latter a restrictor 166 (that is to say, a passage of reduced cross-section) for the damping fluid flowing from the annular cavity 132 to the lower chamber of the shock absorber. Moreover, in the area of connection between the bottom wall 158 and the cylindrical lateral wall 160 of the movable element 152, at least one opening 168 is provided, which is made in such a manner as to put the annular cavity 132 in fluid communication with the lower chamber of the shock absorber through the restrictor 166. The opening 168 has, therefore, the function of allowing the damping fluid collected in the annular cavity 132 (as a result of the movable element 152 moving away from the partition plate 106) to flow toward the lower chamber of the shock absorber.

In general terms, the maximum-curve rebound valve 24 has:

a first variable restrictor (formed in the present case by the passage between the radially outer annular projection 130 and the set of adjustment discs 156), the restriction amount of which depends on the position of the movable element 152 and through which the upper chamber of the shock absorber is in fluid communication with the lower chamber of the shock absorber;

a second variable restrictor (formed in the present case by the passage between the radially inner annular projection 128 and the set of adjustment discs 156), the restriction amount of which depends on the position of the movable element 152 and through which the upper chamber of the shock absorber is in fluid communication with an auxiliary chamber of the valve (formed in the present case by the annular cavity 132);

a first fixed restrictor (formed in the present case by the passage 166 between the adjustment discs 156 and the outer cylindrical lateral surface of the hollow cylindrical lower portion 62 of the inner body 54) through which the auxiliary chamber of the valve is in fluid communication with the lower chamber of the shock absorber in such a manner that the value of the pressure in the auxiliary chamber 132 of the valve, along with the opening force of the valve opposing the resilient force produced by the spring 154, increases as a result of the increase in the opening amount of the valve; and a second fixed restrictor (formed in the present case by the radial opening 164 provided at least in the top adjustment disc 156) through which the upper chamber of the shock absorber is in fluid communication with the lower chamber of the shock absorber parallel with the first variable restrictor.

The aforesaid second fixed restrictor might also be omitted.

The spring (or the assembly of springs) of each valve of minimum curve has a lower stiffness than that of the spring (or of the set of springs) of the corresponding maximum-curve valve. The spring 78 of the minimum-curve compensation valve 18 has, therefore, a lower stiffness than that of the spring 136 of the maximum-curve compensation valve 22. Likewise, the spring 82 of the minimum-curve rebound valve 20 has a lower stiffness than that, of the spring 154 of the maximum-curve rebound valve 24. Accordingly, with the solenoid valve 14 in the normal "open" condition (solenoid 50 in the "non-energized" state), the flow of the damping fluid between the upper and lower chambers of the shock absorber occurs through the axial bores 72, 74 in the inner body 54 of the valve assembly 16 under control of the minimum-carve compensation valve 18 and of the minimum-curve rebound valve 20. Whereas, with the solenoid valve 14 in the "closed" condition (solenoid 50 in the "energized" state), the flow of the damping fluid between the upper and lower chambers of the shock absorber occurs through the axial bores 110, 112 in the outer body 56 of the valve assembly 16 under control of the maximum-curve compensation valve 22 and of the maximum-curve rebound valve 24.

The operation of the minimum-curve rebound valve 20 is described now by way of example, it being clear that what is said in connection with this valve is equally well applicable to the maximum-curve compensation valve 22 and to the maximum-curve rebound valve 24.

In the "closed" condition of the valve 20, the movable element 80 is subject, to the resilient force of the spring 82, which tends to urge this element, along with the adjustment discs 84, against the annular projections 94, 96 (i.e., to keep the valve closed) and to the force applied by the pressure of the damping fluid contained in the upper chamber of the shock absorber (pressure that is higher than that in the lower chamber of the shock absorber). In this condition, the radial opening (or the radial openings) 100 provided at least in the top adjustment disc 84 allows (allow) the passage of fluid (although in a very small amount) from the upper chamber to the lower chamber of the shock absorber. The annular cavity 98 is in fluid communication, through the restrictor 102, with the lower chamber of the shock absorber, whereby the value of the pressure in this cavity is close to the value of the pressure in the lower chamber of the shock absorber. When the pressure of the fluid in the upper chamber of the shock absorber is such as to overcome the resilient force of the spring 82, the movable element 80 moves away from the projections 94, 96 of the partition plate 70, thus allowing also the adjustment discs 84 to move away from these projections. The damping fluid contained in the upper chamber of the shock absorber can now flow toward the lower chamber of the shock absorber not only directly through the passage defined between the top adjustment disc 84 and the radially outer annular protection 96, but also indirectly through the annular cavity 98, through the restrictor 102, and through the opening 104 provided in the movable element 80.

The pressure loss due to the restrictor defined between the top adjustment disc 84 and the radially inner annular projection 94 causes the pressure in the annular cavity 98 to be lower than the pressure in the upper chamber of the shock absorber. The difference between these two pressures decreases progressively with the increase in the opening amount of the valve until it becomes close to zero. Accordingly, the effective value of the area on which the pressure of the upper chamber of the shock absorber acts varies from a minimum value equal to the area of the second axial through-bores 74 to a maximum value tending to be equal to the sum of the areas of the second axial through-bores 74 and of the annular cavity 98.

Figure 4:
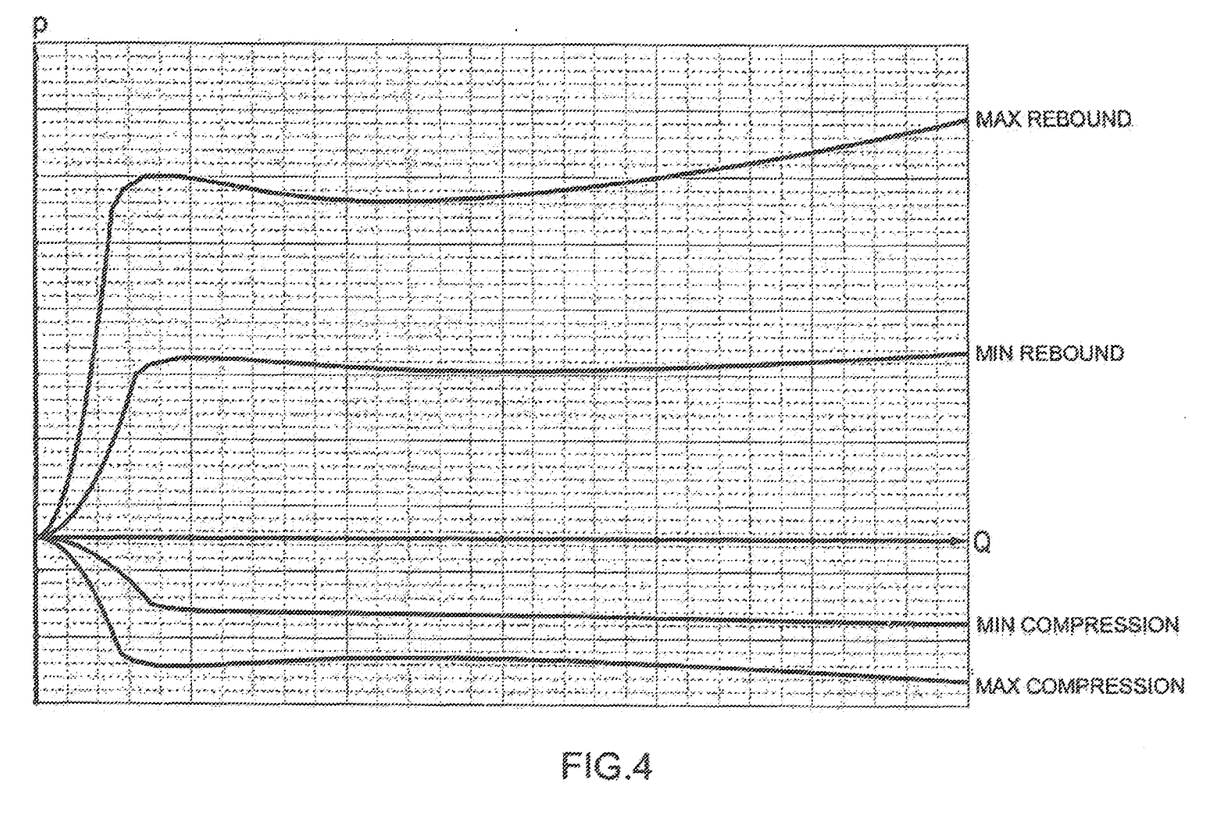
FIG. 4 is a pressure-flow-rate diagram illustrating examples of operating characteristics that can be obtained with a damping-adjustable shock absorber comprising a piston according to the invention.

This effect of amplification of the force applied by the pressure of the damping fluid against the elastic reaction of the spring allows to obtain the second "degressive" section of the pressure-flow rate (or force-speed) characteristic curve of the shock absorber in the "rebound" phase with open solenoid valve. Similar pressure-flow rate (or force-speed) characteristics of "degressive" type can be obtained with the solenoid valve in the "closed" condition, both in the "compression" phase and in the "rebound" phase, under control of the maximum-curve compensation valve and of the maximum-curve rebound valve, respectively, as shown in the diagram of FIG. 4.

The minimum-curve compensation valve 18, which, in the proposed example, is of conventional type, might also be made as a unidirectional valve of the same type as the one forming the subject matter of the above-mentioned Italian Patent Application TO2009A000681. In this connection, the partition plate 70 of the inner body 54 of the valve assembly 16 forms, on its top face, a radially inner annular projection 170 and a radially outer annular projection 172 that delimit radially the first axial through-bores 72. The partition plate 70 also has, on its top lace, an annular cavity 174 that is open upward and is radially defined between the radially outer annular projection 172 and the inner cylindrical lateral surface of the upper hollow cylindrical portion 60 of the inner body 54, it is, therefore, possible to replace the closing element 76 of the valve 18 illustrated in FIG. 2 with a movable-element and a set of adjustment discs such as those described above with reference to the other three passive flow-control valves 20, 22, 24.

In view of the above description, the advantages obtained with a piston for a damping-adjustable shock absorber according to the invention are evident.

First of all, the use of a flow-dividing solenoid valve in combination with four passive flow-control valves allows to obtain, both in the "compression" phase and in the "rebound" phase, a pair of limit characteristic curves corresponding to the "open" condition and to the "closed" condition of the solenoid valve, respectively.

Secondly, the use of a normally-open solenoid valve allows to obtain a soft response of the shock absorber, both in the "compression" phase and in the "rebound" phase, with no need to energize the solenoid of the solenoid valve and without increasing, therefore, the energy consumption of the vehicle on which the shock absorber is installed.

Moreover, the four passive flow-control valves can be adjusted independently of each other by changing the "stiffness" characteristics of the springs and, in case of use of valves of the same type as the one forming the subject matter of Italian Patent Application TO2009A000681, by changing the number and the geometry of the adjustment discs, which allows to adjust the four limit characteristic curves of the shock absorber independently of each other.

Finally, the use of valves of the same type as the one forming the subject matter of Italian Patent Application TO2009A000681 as passive flow-control valves allows to obtain pressure-flow rate (or force-speed) characteristics of the shock absorber having a "degressive" profile.

The invention has been described above in an illustrative manner, it is to be understood that the terminology that has been used above is intended to be in the nature of words of description rather than of limitation. Many modifications and variations of the invention are possible in light of the above teachings. Therefore, within the scope of the appended claims, the invention may be practiced other than, as specifically described above.

What is claimed is:

1. A piston (10) for a damping-adjustable shock absorber, and arranged to be slidably mounted inside a cylinder of the shock absorber to split the shock absorber into a lower chamber and an upper chamber, the piston (10) comprising:
a first pair of passive flow-control valves (18, 20) for controlling flow of a damping fluid between the lower chamber and the upper chamber via a first flow path (42, 40, 44, 72, 74, 68), the first pair of passive flow-control valves (18, 20) including a first compensation valve (18) made as a check valve arranged to control the flow of the damping fluid from the lower chamber to the upper chamber, and a first rebound valve (20) made as a check valve arranged to control the flow of the damping fluid from the upper chamber to the lower chamber wherein the first compensation valve (18) includes a first resilient element (78) adapted to keep the first compensation valve normally closed and the first rebound valve (20) includes a second resilient element (82) adapted to keep the first compensation valve normally closed;

a second pair of passive flow-control valves (22, 24) for controlling the flow of the damping fluid between the lower chamber and the upper chamber via a second flow path (118, 110, 112, 120) separate from the first flow path (42, 40, 44, 72, 74, 68), the second pair of passive flow-control valves (22, 24) including a second compensation valve (22) made as a check valve arranged to control the flow of the damping fluid from the lower chamber to the upper chamber, and a second rebound valve (24) made as a check valve arranged to control the flow of the damping fluid from the upper chamber to the lower chamber wherein the second compensation valve (22) includes a third resilient element (136) adapted to keep the second compensation valve normally closed and the second rebound valve (24) includes a fourth resilient element (154) adapted to keep the second compensation valve normally closed;

a flow-dividing solenoid valve (14) shiftable between a first operating position that allows the damping fluid to flow between the upper chamber and the lower chamber via the first pair of passive flow-control valves (18, 20) and the second pair of passive flow-control valves (22, 24) and, thus, the first flow path (42, 40, 44, 72, 74, 68) and the second flow path (118, 110, 112, 120) and a second operating position that allows the damping fluid to flow between the upper chamber and the lower chamber via only the second pair of passive flow-control valves (22, 24) and, thus, the second flow path (118, 110, 112, 120) wherein the solenoid valve (14) is normally open such that the solenoid valve (14) is normally held in the first operating position;

wherein the piston comprises further a rod (12), a valve assembly (16), and a connecting body (26) substantially axially interposed between and fixed to the rod (12) and the valve assembly (16), the valve assembly (16) and the connecting body (26) defining, between the upper chamber and the lower chamber, the first flow path (42, 40, 44, 72, 74, 68) and the second flow path (118, 110, 112, 120) and the solenoid valve (14) including a solenoid (50) fixed inside the rod (12) and a poppet (46) arranged inside the connecting body (26) to be moved under control of the solenoid (50) between an open position, corresponding to the first operating position of the solenoid valve (14) that opens the first flow path (42, 40, 44, 72, 74, 68), and a closed position, corresponding to the second operating position of the solenoid valve (14) that closes the first flow path (42, 40, 44, 72, 74, 68);

wherein the valve assembly (16) includes a hollow inner body (54) defining, along with the connecting body (26), the first flow path (42, 40, 44, 72, 74, 68) and a hollow outer body (56) that is arranged substantially coaxially with the inner body (54) and defines, along with the inner body (54), the second flow path (118, 110, 112, 120), the first pair of passive flow-control valves (18, 20) being located in the inner body (54) and the second pair of passive flow-control valves (22, 24) being located between the inner body (54) and the outer body (56);

wherein the valve assembly (16) further includes a first partition plate (70) that is accommodated in a chamber (66) of the inner body (54) to split the chamber (66) into an upper chamber portion and a lower chamber portion and has first and second through-bores (72, 74) adapted to put the chamber portions in fluid communication with each other, the first through-bores (72) being arranged radially outwardly of the second-through bores (74) and the first compensation valve (18) and the first rebound valve (20) being located in the upper chamber portion and the lower chamber portion, respectively;

wherein the first partition plate (70) defines, on a side of the lower chamber portion, an auxiliary chamber (98), the first rebound valve (20) includes a movable element (80) on which the second resilient element (82) acts and at least one adjustment disc (84) that is interposed between the movable element (80) and the first partition plate (70) and cooperates with the second through-bores (74), and the first rebound valve (20) is configured to have:

a first variable restrictor (96, 84) a restriction amount of which depends on a position of the movable element (80) and through which the upper chamber portion is in fluid communication with the lower chamber portion;

a second variable restrictor (94, 84) a restriction amount of which depends on the position of the movable element (80) and through which the upper chamber portion is in fluid communication with the auxiliary chamber (98); and a first fixed restrictor (102) via which the auxiliary chamber (98) is in fluid communication with the lower chamber portion, whereby, as a result of an increase in a distance between the movable element (80) and the first partition plate (70), a pressure value in the auxiliary chamber (98) and an opening force acting on the movable element (80) against a resilient force generated by the second resilient element (82) increase; and wherein the first partition plate (70) forms, on a side facing toward the lower chamber portion, a first annular projection (94) and a second annular projection (96) that radially limit the second through-bores (74), the auxiliary chamber (98) is formed by an annular cavity of the first partition plate (70) extending radially between a substantially cylindrical guide element (90) substantially coaxial to the piston and the first annular projection (94), the first variable restrictor (96, 94) is formed by a passage between the second annular projection (96) and the at least one adjustment disc (84), the second variable restrictor (94, 84) is formed by a passage between the first annular projection (94) and the at least one adjustment disc (84), and the first fixed restrictor (102) is defined by a difference of radius between an inner edge of the at least one adjustment disc (84) and an outer lateral surface of the cylindrical guide element (90).

2. The piston according to claim 1, wherein the first flow path (42, 40, 44, 72, 74, 68) includes a plurality of radial bores (42) provided in an intermediate portion (36) of the connecting body (26) projecting from the rod (12) to debouch into the upper chamber and the poppet (46) of the solenoid valve (14) is slidable in a substantially axial direction of the piston to control an opening of the radial bores (42).

3. The piston according to claim 1, wherein the movable element has a first opening (104) adapted to put the auxiliary chamber (98) in fluid communication with the lower chamber portion via the fixed restrictor (102);

wherein the second compensation valve (22) comprises a second movable element (134) and a second auxiliary chamber (126), the second movable element has a second opening (150) adapted to put the second auxiliary chamber in fluid communication with the upper chamber via a second fixed restrictor (148);

wherein the second rebound valve (24) comprises a third movable element (152) and a third auxiliary chamber (132), wherein the third movable element has a third opening (168) adapted to put the third auxiliary chamber in fluid communication with the lower chamber via a third fixed restrictor (166).

4. The piston according to claim 3, wherein the movable element, the second movable element, and the third movable element each comprise a bottom wall, a substantially cylindrical lateral wall, and a connection region connecting the bottom wall to the substantially cylindrical lateral wall; and
the first opening, the second opening, and the third opening are provided in a respective one of the connection regions.

5. A damping-adjustable shock absorber comprising:
a cylinder; and
a piston (10) substantially axially slidably mounted inside the cylinder to split the shock absorber into a lower chamber and an upper chamber and including:
a first pair of passive flow-control valves (18, 20) for controlling flow of a damping fluid between the lower chamber and the upper chamber via a first flow path (42, 40, 44, 72, 74, 68), the first pair of passive flow-control valves (18, 20) including a first compensation valve (18) made as a check valve arranged to control the flow of the damping fluid from the lower chamber to the upper chamber, and a first rebound valve (20) made as a check valve arranged to control the flow of the damping fluid from the upper chamber to the lower chamber, wherein the first compensation valve (18) includes a first resilient element (78) adapted to keep the first compensation valve normally closed and the first rebound valve (20) includes a second resilient element (82) adapted to keep the first compensation valve normally closed;
a second pair of passive flow-control valves (22, 24) for controlling the flow of the damping fluid between the lower chamber and the upper chamber via a second flow path (118, 110, 112, 120) separate from the first flow path (42, 40, 44, 72, 74, 68), the second pair of passive flow-control valves (22, 24) including a second compensation valve (22) made as a check valve arranged to control the flow of the damping fluid from the lower chamber to the upper chamber, and a second rebound valve (24) made as a check valve arranged to control the flow of the damping fluid from the upper chamber to the lower chamber, wherein the second compensation valve (22) includes a third resilient element (136) adapted to keep the second compensation valve normally closed and the second rebound valve (24) includes a fourth resilient element (154) adapted to keep the second compensation valve normally closed;
a flow-dividing solenoid valve (14) shiftable between a first operating position that allows the damping fluid to flow between the upper chamber and the lower chamber via the first pair of passive flow-control valves (18, 20) and the second pair of passive flow-control valves (22, 24) and, thus, the first flow path (42, 40, 44, 72, 74, 68) and the second flow path (118, 110, 112, 120) and a second operating position that allows the damping fluid to flow between the upper chamber and the lower chamber via only the second pair of passive flow-control valves (22, 24) and, thus, the second flow path (118, 110, 112, 120), wherein the solenoid valve (14) is normally open such that the solenoid valve (14) is normally held in the first operating position;
wherein the piston further comprises a rod (12), a valve assembly (16), and a connecting body (26) substantially axially interposed between and fixed to the rod (12) and the valve assembly (16) the valve assembly (16), and the connecting body (26) defining, between the upper chamber and the lower chamber, the first flow path (42, 40, 44, 72, 74, 68) and the second flow path (118, 110, 112, 120) and the solenoid valve (14) including a solenoid (50) fixed inside the rod (12) and a poppet (46) arranged inside the connecting body (26) to be moved under control of the solenoid (50) between an open position, corresponding to the first operating position of the solenoid valve (14) that opens the first flow path (42, 40, 44, 72, 74, 68), and a closed position, corresponding to the second operating position of the solenoid valve (14) that closes the first flow path (42, 40, 44, 72, 74, 68);
wherein the valve assembly (16) includes a hollow inner body (54) defining, along with the connecting body (26), the first flow path (42, 40, 44, 72, 74, 68) and a hollow outer body (56) that is arranged substantially coaxially with the inner body (54) and defines, along with the inner body (54), the second flow path (118, 110, 112, 120), the first pair of passive flow-control valves (18, 20) being located in the inner body (54) and the second pair of passive flow-control valves (22, 24) being located between the inner body (54) and the outer body (56);
wherein the valve assembly (16) further includes a first partition plate (70) that is accommodated in a chamber (66) of the inner body (54) to split the chamber (66) into an upper chamber portion and a lower chamber portion and has first and second through-bores (72, 74) adapted to put the chamber portions in fluid communication with each other, the first through-bores (72) being arranged radially outwardly of the second-through bores (74) and the first compensation valve (18) and the first rebound valve (20) being located in the upper chamber portion and the lower chamber portion, respectively;
wherein the first partition plate (70) defines, on a side of the lower chamber portion, an auxiliary chamber (98), the first rebound valve (20) includes a movable element (80) on which the second resilient element (82) acts and at least one adjustment disc (84) that is interposed between the movable element (80) and the first partition plate (70) and cooperates with the second through-bores (74), and the first rebound valve (20) is configured to have:
a first variable restrictor (96, 84) a restriction amount of which depends on a position of the movable element (80) and through which the upper chamber portion is in fluid communication with the lower chamber portion;
a second variable restrictor (94, 84) a restriction amount of which depends on the position of the movable element (80) and through which the upper chamber portion is in fluid communication with the auxiliary chamber (98); and
a first fixed restrictor (102) via which the auxiliary chamber (98) is in fluid communication with the lower chamber portion, whereby, as a result of an increase in a distance between the movable element (80) and the first partition plate (70), a pressure value in the auxiliary chamber (98) and an opening force acting on the movable element (80) against a resilient force generated by the second resilient element (82) increase; and
wherein the first partition plate (70) forms, on a side facing toward the lower chamber portion, a first annular projection (94) and a second annular projection (96) that radially limit the second through-bores (74), the auxiliary chamber (98) is formed by an annular cavity of the first partition plate (70) extending radially between a substantially cylindrical guide element (90) substantially coaxial to the piston and the first annular projection (94), the first variable restrictor (96, 94) is formed by a passage between the second annular projection (96) and the at least one adjustment disc (84), the second variable restrictor (94, 84) is formed by a passage between the first annular projection (94) and the at least one adjustment disc (84), and the first fixed restrictor (102) is defined by a difference of radius between an inner edge of the at least one adjustment disc (84) and an outer lateral surface of the cylindrical guide element (90).

6. The damping-adjustable shock absorber according to claim 5, wherein the shock absorber is for a vehicle suspension.

7. A piston (10) for a damping-adjustable shock absorber, and-arranged to be slidably mounted inside a cylinder of the shock absorber to split the shock absorber into a lower chamber and an upper chamber, the piston (10) comprising:
a first pair of passive flow-control valves (18, 20) for controlling flow of a damping fluid between the lower chamber and the upper chamber via a first flow path (42, 40, 44, 72, 74, 68), the first pair of passive flow-control valves (18, 20) including a first compensation valve (18) made as a check valve arranged to control the flow of the damping fluid from the lower chamber to the upper chamber, and a first rebound valve (20) made as a check valve arranged to control the flow of the damping fluid from the upper chamber to the lower chamber wherein the first compensation valve (18) includes a first resilient element (78) adapted to keep the first compensation valve normally closed and the first rebound valve (20) includes a second resilient element (82) adapted to keep the first compensation valve normally closed;
a second pair of passive flow-control valves (22, 24) for controlling the flow of the damping fluid between the lower chamber and the upper chamber via a second flow path (118, 110, 112, 120) separate from the first flow path (42, 40, 44, 72, 74, 68), the second pair of passive flow-control valves (22, 24) including a second compensation valve (22) made as a check valve arranged to control the flow of the damping fluid from the lower chamber to the upper chamber, and a second rebound valve (24) made as a check valve arranged to control the flow of the damping fluid from the upper chamber to the lower chamber wherein the second compensation valve (22) includes a third resilient element (136) adapted to keep the second compensation valve normally closed and the second rebound valve (24) includes a fourth resilient element (154) adapted to keep the second compensation valve normally closed;
a flow-dividing solenoid valve (14) shiftable between a first operating position that allows the damping fluid to flow between the upper chamber and the lower chamber via the first pair of passive flow-control valves (18, 20) and the second pair of passive flow-control valves (22, 24) and, thus, the first flow path (42, 40, 44, 72, 74, 68) and the second flow path (118, 110, 112, 120) and a second operating position that allows the damping fluid to flow between the upper chamber and the lower chamber via only the second pair of passive flow-control valves (22, 24) and, thus, the second flow path (118, 110, 112, 120 wherein the solenoid valve (14) is normally open such that the solenoid valve (14) is normally held in the first operating position;
wherein the piston comprises further a rod (12), a valve assembly (16), and a connecting body (26) substantially axially interposed between and fixed to the rod (12) and the valve assembly (16), the valve assembly (16) and the connecting body (26) defining, between the upper chamber and the lower chamber, the first flow path (42, 40, 44, 72, 74, 68) and the second flow path (118, 110, 112, 120) and the solenoid valve (14) including a solenoid (50) fixed inside the rod (12) and a poppet (46) arranged inside the connecting body (26) to be moved under control of the solenoid (50) between an open position, corresponding to the first operating position of the solenoid valve (14) that opens the first flow path (42, 40, 44, 72, 74, 68), and a closed position, corresponding to the second operating position of the solenoid valve (14) that closes the first flow path (42, 40, 44, 72, 74, 68);
wherein the valve assembly (16) includes a hollow inner body (54) defining, along with the connecting body (26), the first flow path (42, 40, 44, 72, 74, 68) and a hollow outer body (56) that is arranged substantially coaxially with the inner body (54) and defines, along with the inner body (54), the second flow path (118, 110, 112, 120), the first pair of passive flow-control valves (18, 20) being located in the inner body (54) and the second pair of passive flow-control valves (22, 24) being located between the inner body (54) and the outer body (56);
wherein the valve assembly (16) further includes a first partition plate (70) that is accommodated in a chamber (66) of the inner body (54) to split the chamber (66) into an upper chamber portion and a lower chamber portion and has first and second through-bores (72, 74) adapted to put the chamber portions in fluid communication with each other, the first through-bores (72) being arranged radially outwardly of the second-through bores (74) and the first compensation valve (18) and the first rebound valve (20) being located in the upper chamber portion and the lower chamber portion, respectively;
wherein the outer body (56) of the valve assembly (16) includes a substantially cylindrical sleeve (108) that is intended to be slidably arranged along an inner substantially cylindrical surface of the shock absorber and a second partition plate (106) that extends between the cylindrical sleeve (108) and the inner body (54) to separate the upper chamber from the lower chamber and has first and second through-bores (110, 112) adapted to put the upper and lower chambers in fluid communication with each other, the first through-bores (110) are arranged radially outwardly of the second through-bores (112), the second compensation valve (22) is located on a side of the second partition plate (106) facing toward the upper chamber and controls an opening of the first through-bores (110), and the second rebound valve (24) is located on the side of the second partition plate (106) facing toward the lower chamber-and controls an opening of the second through-bores (112);
wherein the second partition plate (106) defines, on a side of the upper chamber, a first auxiliary chamber (126), the second compensation valve (22) includes a movable element (134) on which the third resilient element (136) acts and at least one adjustment disc (138) that is interposed between the movable element (134) and the second partition plate (106) and cooperates with the first through-bores (110) of the second partition plate (106), and the second compensation valve (22) is configured to have:
a first variable restrictor (122, 138) a restriction amount of which depends on a position of the movable element (134) and through which the lower chamber is in fluid communication with the upper chamber;

a second variable restrictor (124, 138) a restriction amount of which depends on the position of the movable element (134) and through which the lower chamber is in fluid communication with the first auxiliary chamber (126) of the second partition plate (106); and a first fixed restrictor (148) through which the first auxiliary chamber (126) of the second partition plate (106) is in fluid communication with the upper chamber whereby, as a result of an increase in a distance between the movable element (134) and the second partition plate (106), a value of a pressure in the first auxiliary chamber (126) of the second partition plate (106) and an opening force acting on the movable element (134) against a resilient force generated by the third resilient element (136) increase;

wherein the second partition plate (106) forms, on a side facing toward the upper chamber, a first annular projection (122) and a second annular projection (124) that radially delimit the first axial through-bores (110) of the second partition plate (106), the first auxiliary chamber (126) of the second partition plate (106) is formed by an annular cavity of the second partition plate (106) extending radially between the cylindrical sleeve (108) of the outer body (56) and the second annular projection (124) of the second partition plate (106), the first variable restrictor (122, 138) of the second compensation valve (22) is formed by a passage between the first annular projection (122) of the second partition plate (106) and the at least one adjustment disc (138), the second variable restrictor (124, 138) of the second compensation valve (22) is formed by a passage between the second annular projection (124) of the second partition plate (106) and the at least one adjustment disc (138), and the first fixed restrictor (148) of the second compensation valve (22) is defined by a difference of radius between an outer edge of the at least one adjustment disc (138) and an inner lateral surface of the cylindrical sleeve (108) of the outer body (56).

8. A piston (10) for a damping-adjustable shock absorber, and-arranged to be slidably mounted inside a cylinder of the shock absorber to split the shock absorber into a lower chamber and an upper chamber, the piston (10) comprising:

a first pair of passive flow-control valves (18, 20) for controlling flow of a damping fluid between the lower chamber and the upper chamber via a first flow path (42, 40, 44, 72, 74, 68), the first pair of passive flow-control valves (18, 20) including a first compensation valve (18) made as a check valve arranged to control the flow of the damping fluid from the lower chamber to the upper chamber, and a first rebound valve (20) made as a check valve arranged to control the flow of the damping fluid from the upper chamber to the lower chamber wherein the first compensation valve (18) includes a first resilient element (78) adapted to keep the first compensation valve normally closed and the first rebound valve (20) includes a second resilient element (82) adapted to keep the first compensation valve normally closed;

a second pair of passive flow-control valves (22, 24) for controlling the flow of the damping fluid between the lower chamber and the upper chamber via a second flow path (118, 110, 112, 120) separate from the first flow path (42, 40, 44, 72, 74, 68), the second pair of passive flow-control valves (22, 24) including a second compensation valve (22) made as a check valve arranged to control the flow of the damping fluid from the lower chamber to the upper chamber, and a second rebound valve (24) made as a check valve arranged to control the flow of the damping fluid from the upper chamber to the lower chamber wherein the second compensation valve (22) includes a third resilient element (136) adapted to keep the second compensation valve normally closed and the second rebound valve (24) includes a fourth resilient element (154) adapted to keep the second compensation valve normally closed;

a flow-dividing solenoid valve (14) shiftable between a first operating position that allows the damping fluid to flow between the upper chamber and the lower chamber via the first pair of passive flow-control valves (18, 20) and the second pair of passive flow-control valves (22, 24) and, thus, the first flow path (42, 40, 44, 72, 74, 68) and the second flow path (118, 110, 112, 120) and a second operating position that allows the damping fluid to flow between the upper chamber and the lower chamber via only the second pair of passive flow-control valves (22, 24) and, thus, the second flow path (118, 110, 112, 120) wherein the solenoid valve (14) is normally open such that the solenoid valve (14) is normally held in the first operating position;

wherein the piston comprises further a rod (12), a valve assembly (16), and a connecting body (26) substantially axially interposed between and fixed to the rod (12) and the valve assembly (16) the valve assembly (16) and the connecting body (26) defining, between the upper chamber and the lower chamber, the first flow path (42, 40, 44, 72, 74, 68) and the second flow path (118, 110, 112, 120) and the solenoid valve (14) including a solenoid (50) fixed inside the rod (12) and a poppet (46) arranged inside the connecting body (26) to be moved under control of the solenoid (50) between an open position, corresponding to the first operating position of the solenoid valve (14) that opens the first flow path (42, 40, 44, 72, 74, 68), and a closed position, corresponding to the second operating position of the solenoid valve (14) that closes the first flow path (42, 40, 44, 72, 74, 68);

wherein the valve assembly (16) includes a hollow inner body (54) defining, along with the connecting body (26), the first flow path (42, 40, 44, 72, 74, 68) and a hollow outer body (56) that is arranged substantially coaxially with the inner body (54) and defines, along with the inner body (54), the second flow path (118, 11 O, 112, 120), the first pair of passive flow-control valves (18, 20) being located in the inner body (54) and the second pair of passive flow-control valves (22, 24) being located between the inner body (54) and the outer body (56);

wherein the valve assembly (16) further includes a first partition plate (70) that is accommodated in a chamber (66) of the inner body (54) to split the chamber (66) into an upper chamber portion and a lower chamber portion and has first and second through-bores (72, 74) adapted to put the chamber portions in fluid communication with each other, the first through-bores (72) being arranged radially outwardly of the second-through bores (74) and the first compensation valve (18) and the first rebound valve (20) being located in the upper chamber portion and the lower chamber portion, respectively;

wherein the outer body (56) of the valve assembly (16) includes a substantially cylindrical sleeve (108) that is intended to be slidably arranged along an inner substantially cylindrical surface of the shock absorber and a second partition plate (106) that extends between the cylindrical sleeve (108) and the inner body (54) to separate the upper chamber from the lower chamber and has first and second through-bores (110, 112) adapted to put the upper and lower chambers in fluid communication with each other, the first through-bores (110) are arranged radially outwardly of the second through-bores (112), the second compensation valve (22) is located on a side of the second partition plate (106) facing toward the upper chamber and controls an opening of the first through-bores (110), and the second rebound valve (24) is located on the side of the second partition plate (106) facing toward the lower chamber-and controls an opening of the second through-bores (112);

wherein the second partition plate (106) defines, on a side of the upper chamber, a first auxiliary chamber (126), the second compensation valve (22) includes a movable element (134) on which the third resilient element (136) acts and at least one adjustment disc (138) that is interposed between the movable element (134) and the second partition plate (106) and cooperates with the first through-bores (110) of the second partition plate (106), and the second compensation valve (22) is configured to have:

a first variable restrictor (122, 138) a restriction amount of which depends on a position of the movable element (134) and through which the lower chamber is in fluid communication with the upper chamber;

a second variable restrictor (124, 138) a restriction amount of which depends on the position of the movable element (134) and through which the lower chamber is in fluid communication with the first auxiliary chamber (126) of the second partition plate (106); and a first fixed restrictor (148) through which the first auxiliary chamber (126) of the second partition plate (106) is in fluid communication with the upper chamber whereby, as a result of an increase in a distance between the movable element (134) and the second partition plate (106), a value of a pressure in the first auxiliary chamber (126) of the second partition plate (106) and an opening force acting on the movable element (134) against a resilient force generated by the third resilient element (136) increase;

wherein the second partition plate (106) forms, on a side facing toward the upper chamber, a first annular projection (122) and a second annular projection (124) that radially delimit the first axial through-bores (110) of the second partition plate (106), the first auxiliary chamber (126) of the second partition plate (106) is formed by an annular cavity of the second partition plate (106) extending radially between the cylindrical sleeve (108) of the outer body (56) and the second annular projection (124) of the second partition plate (106), the first variable restrictor (122, 138) of the second compensation valve (22) is formed by a passage between the first annular projection (122) of the second partition plate (106) and the at least one adjustment disc (138), the second variable restrictor (124, 138) of the second compensation valve (22) is formed by a passage between the second annular projection (124) of the second partition plate (106) and the at least one adjustment disc (138), and the first fixed restrictor (148) of the second compensation valve (22) is defined by a difference of radius between an outer edge of the at least one adjustment disc (138) and an inner lateral surface of the cylindrical sleeve (108) of the outer body (56);

wherein the second partition plate (106) defines, on a side of the lower chamber, a second auxiliary chamber (132), the second rebound valve (24) includes a second movable element (152) on which the fourth resilient element (154) acts and at least one second adjustment disc (156) that is interposed between the second movable element (152) and the second partition plate (106) and cooperates with the second through-bores (112) of the second partition plate (106), and the second rebound valve (24) is configured to have:

a third variable restrictor (130, 156) a restriction amount of which depends on a position of the second movable element (152) and through which the upper chamber is in fluid communication with the lower chamber;

a fourth variable restrictor (128, 156) a restriction amount of which depends on the position of the second movable element (152) and through which the upper chamber is in fluid communication with the second auxiliary chamber (132) of the second partition plate (106); and a second fixed restrictor (166) through which the second auxiliary chamber (132) of the second partition plate (106) is in fluid communication with the lower chamber whereby, as a result of an increase in a distance between the second movable element (152) and the second partition plate (106), a value of a pressure in the second auxiliary chamber (132) of the second partition plate (106) and an opening force acting on the second movable element (152) against a resilient force generated by the fourth resilient element (154), increase;

wherein the second partition plate (106) forms, on a side facing toward the lower chamber, a third annular projection (130) and a fourth annular projection (128) that radially limit the second axial through-bores (112) of the second partition plate (106), the second auxiliary chamber (132) of the second partition plate (106) is formed by a second annular cavity of the second partition plate (106) extending radially between a substantially cylindrical surface (62) of the inner body (54) and the fourth annular projection (128) of the second partition plate (106), the third variable restrictor (130, 156) of the second rebound valve (24) is formed by a passage between the third annular projection (130) of the second partition plate (106) and the at least one second adjustment disc (156), the fourth variable restrictor (128, 156) of the second rebound valve (24) is formed by a passage between the fourth annular projection (128) of the second partition plate (106) and the at least one second adjustment disc (156), and the second fixed restrictor (166) of the second rebound valve (24) is defined by a difference of radius between an inner edge of the at least one second adjustment disc (156) and the cylindrical surface (62) of the inner body (54).

\* \* \* \* \*

UNITED STATES PATENT AND TRADEMARK OFFICE
CERTIFICATE OF CORRECTION

PATENT NO. : 9,016,447 B2  
APPLICATION NO. : 13/811971  
DATED : April 28, 2015  
INVENTOR(S) : Gianfranco De Lillo et al.

Page 1 of 1

It is certified that error appears in the above-identified patent and that said Letters Patent is hereby corrected as shown below:

On the title page, item 87 PCT Pub. No.: delete "WO2013/017050" and insert therefor --WO2012/017050--.

In the claims

Column 16, line 2 delete "the valve assembly (16) the valve assembly (16)," and insert therefor --the valve assembly (16), the valve assembly (16)--.

Signed and Sealed this  
First Day of March, 2016

Michelle K. Lee  
*Director of the United States Patent and Trademark Office*